United States Patent [19]

Simon et al.

[11] Patent Number: 5,251,883
[45] Date of Patent: Oct. 12, 1993

[54] ELASTIC CONNECTING BAR FOR A SYSTEM FOR ACTIVE CONTROL OF VIBRATIONS

[75] Inventors: Jean-Michel Simon, Clamart; André Gennesseaux, Paris, both of France

[73] Assignee: Hutchinson, France

[21] Appl. No.: 870,367

[22] Filed: Apr. 17, 1992

[30] Foreign Application Priority Data

Apr. 22, 1991 [FR] France .................. 91 04933

[51] Int. Cl.$^5$ .............................................. F16F 13/00
[52] U.S. Cl. ............................ 267/136; 267/140.13; 267/160; 188/267; 244/17.27
[58] Field of Search ......... 267/30, 35, 71, 74, 267/136, 140.12, 140.13, 141.2, 160; 188/266, 267, 299; 244/17.27, 17.25, 54; 248/562, 638

[56] References Cited

U.S. PATENT DOCUMENTS

| | | | |
|---|---|---|---|
| 3,319,951 | 5/1967 | Seelig | 267/160 |
| 4,858,733 | 8/1989 | Noguchi et al. | 188/267 |
| 4,974,794 | 12/1990 | Aubry et al. | 267/136 X |
| 5,004,215 | 4/1991 | Aubry et al. | 267/140.13 |

FOREIGN PATENT DOCUMENTS

| | | |
|---|---|---|
| 0129363 | 12/1984 | European Pat. Off. . |
| 0233792 | 8/1987 | European Pat. Off. . |
| 0290181 | 11/1988 | European Pat. Off. . |
| 0334716 | 9/1989 | European Pat. Off. . |
| 0335786 | 10/1989 | European Pat. Off. . |
| 2921866 | 12/1980 | Fed. Rep. of Germany ................ 267/140.13 |
| 3009747 | 9/1981 | Fed. Rep. of Germany . |
| WO85/00208 | 1/1985 | PCT Int'l Appl. . |
| 2080919 | 2/1982 | United Kingdom . |
| 2149473 | 6/1985 | United Kingdom . |

Primary Examiner—Robert J. Oberleitner
Assistant Examiner—Kevin D. Rutherford
Attorney, Agent, or Firm—Larson & Taylor

[57] ABSTRACT

An elastic connecting bar for a system for active control of vibrations and which is apt to be subjected, through one of its ends, to vibrational loads exerted along its axis and which is linked by its other end to a structure which it is expedient to isolate from vibrations. The bar includes a tubular part 12 linked to one of the ends 14 of the bar and surrounding a part 15 of smaller section linked to the opposite end 16, and wherein these two parts 12, 15 are transversely linked to one another by at least two elastic bearings 10, 11 which are clasped between, them and axially spaced. The active system is used for control of vibrations acting between said parts 12, 15.

15 Claims, 3 Drawing Sheets

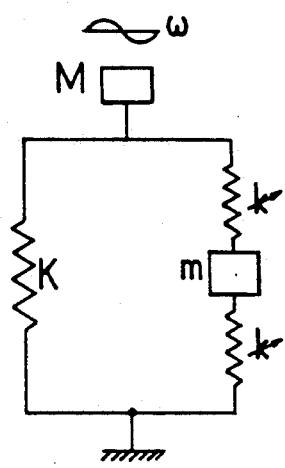
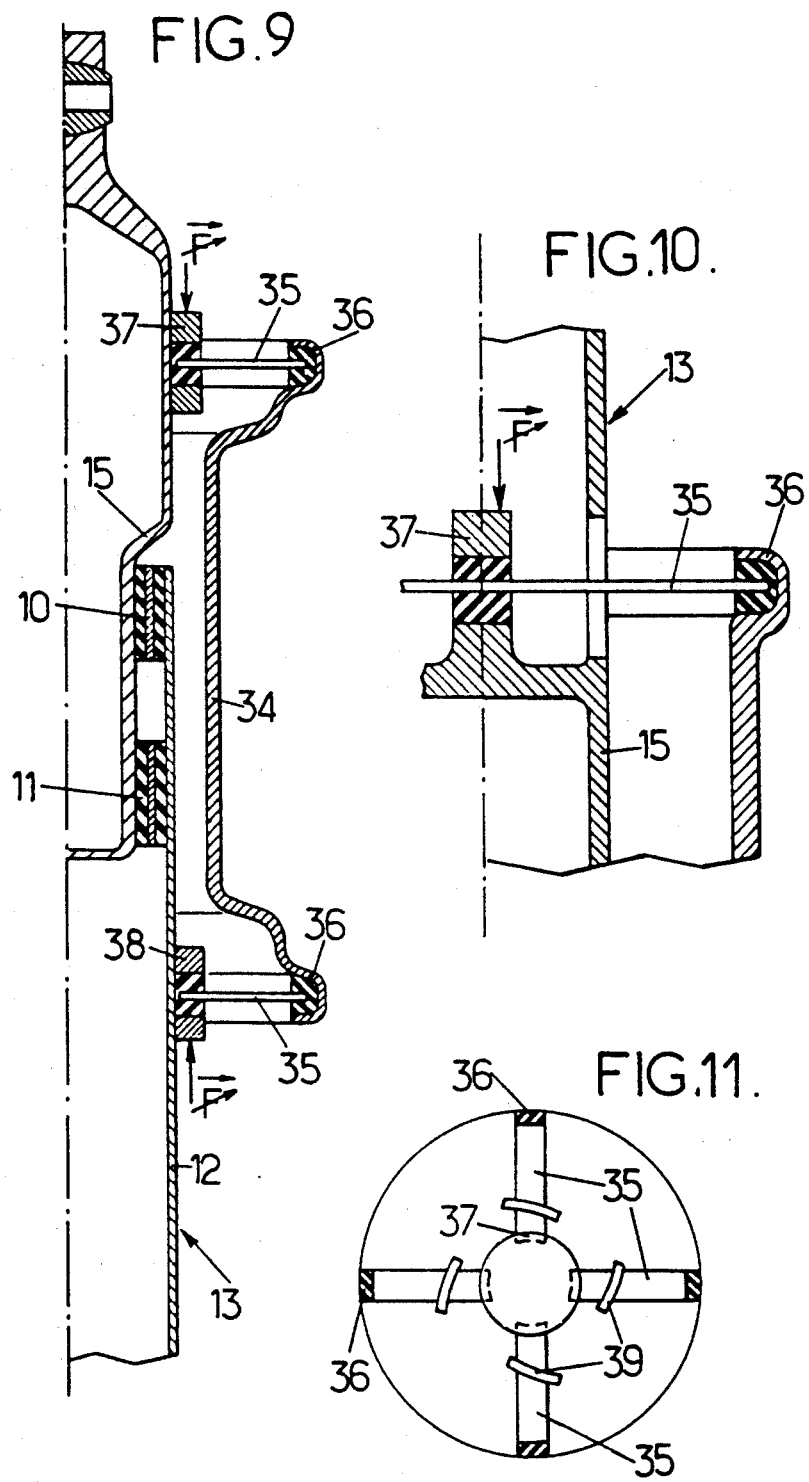
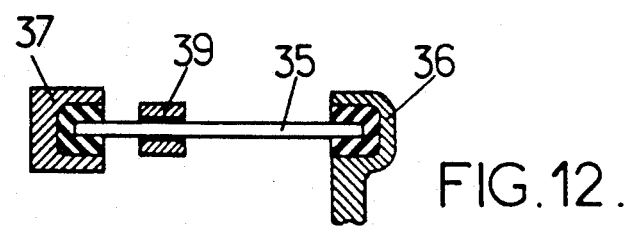

ELASTIC CONNECTING BAR FOR A SYSTEM FOR ACTIVE CONTROL OF VIBRATIONS

The present invention relates to an elastic connecting bar for a system for active control of vibrations and which is apt to be subjected, through one of its ends, to vibrational loads exerted along its axis and which is linked by its other end to a structure which it is expedient to isolate from vibrations.

It can concern in particular, but not exclusively, a bar of an assembly of connecting bars apt to link the rotor of a helicopter to the airframe.

A known solution in current applications consists in using deformable connecting pieces, transmission of the vibrations being all the more diminished the more flexible the connection. However, there is a limit to how flexible the connections can be made, related to the allowable relative movements between the two elements, and in certain cases, the level of vibration of the structure is still very high.

An improvement has been made through active control of vibrations, which consists in creating in the connecting bar forces which exactly oppose the forces of vibrations which are still transmitted to the structure, cancelling them out. It is therefore understood that the role of the system for active control of vibrations mentioned at the start is precisely to create in the connecting bar forces which are well determined in amplitude and in phase, these forces being able to cancel out any reaction at structural level, thus suppressing the vibrations.

A known embodiment of such a system has been represented diagrammatically in FIG. 1 of the attached drawing. The connecting bar has been referenced 1. Since it is only supposed to receive axial loads, swivels 2 and 3 have been represented at its two ends, securing the connection on the one hand to a source of vibrations, and on the other to a structure which it is expedient to preserve from these vibrations. On the swivel 3 side, the bar 1 is tubular and is linked to the foot 4 of the swivel 3 on the one hand by metal springs 5, and on the other by the stem 6 of a hydraulic jack whose piston 7 moves in the cylinder formed by the terminal tubular part of the bar 1. A force sensor 8 interposed between the end of the stem 6 and the foot 4 permits control of the supply of hydraulic fluid to the jack, by way of a servo-valve 9, this to obtain the desired compensating effect described above.

The disadvantage of this type of system for active control of vibrations lies in a significant lateral bulkiness of the metal springs 5, in the fact that the jack is complex and unreliable because of the risk of leaks around the stem 6, and in the fact that friction makes the control difficult. It is further noted that should the jack be blocked, the loads are transmitted directly between the swivels 2 and 3, the springs 5 then being rendered totally inactive.

The aim of the present invention is to remedy all these disadvantages of the prior art, and to this effect a connecting bar of the general type defined at the start is such that essentially it includes a tubular part linked to one of said ends of the bar and surrounding a part of smaller section linked to the opposite end, and such that these two parts are transversely linked to one another by an elastic bearing clasped between them or by at least two axially spaced bearings, said active system for control of vibrations acting between said parts.

It is envisaged that these elastic bearings shall advantageously replace the two metal springs 5 of the above-described known embodiment, with virtually no increase in the lateral bulkiness of the bar. Moreover, high axial flexibility with high radial stiffness will thereby be obtained, due to the fact that rubber admits larger strains in shear than in compression. By adequately separating the bearings in the axial direction or by making use of a single fairly long bearing (of length greater than its diameter), the bar will thereby be able to retain a high stiffness with regard to bending loads, and any risk of buckling will also be avoided. These particularly favorable characteristics of elastic bearings can moreover be further accentuated by making provision for them each to consist of a laminated annular elastomeric block. The reinforcements are coaxial, and can be cylindrical or conical.

As regards the active system for control of vibrations, associated with this or these elastic bearings, it will be possible to implement various arrangements, for example it being possible for a leakproof chamber to be placed under controlled pressure without frictional parts, thereby resolving the problem mentioned above with regard to the jack, or even a phase-shifter with controlled stiffness.

These systems will be described below by way of non-limiting examples, with reference to the other figures of the attached drawing in which:

FIG. 8 is an assembly diagram showing the principle of a phase-shifter in a vibrating system;

FIGS. 9 and 10 are axial half-sectional views of an elastic connecting bar implementing this phase-shifter principle with use of elastic leaves, FIG. 10 being just the partial view of a variant;

FIG. 11 shows diagrammatically, in a radial plane, a spiral cam for regulating the stiffness of these leaves; and FIG. 12 is a view of the regulating system of FIG. 11 in transverse section.

Figure 2:
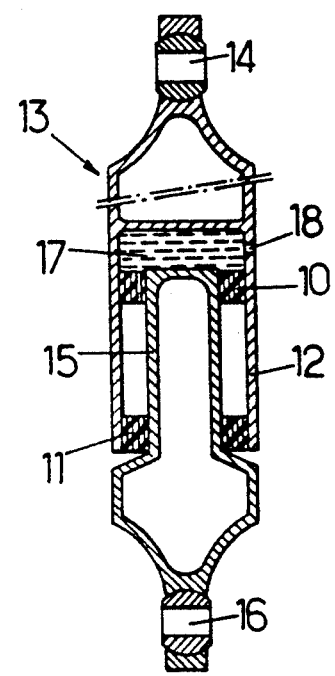
FIG. 2 is a diagrammatic axial sectional view of a connecting bar according to the invention.
Figure 3:
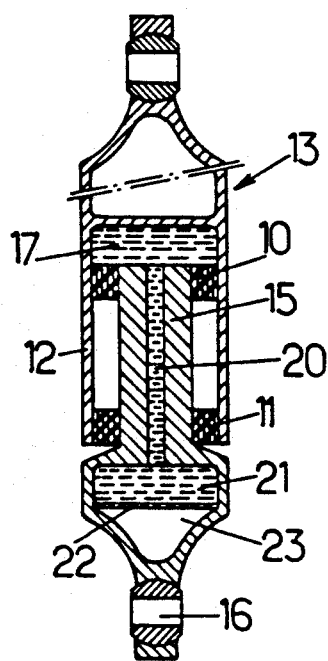
FIG. 3 represents a variant of the embodiment of FIG. 2.

In the various figures, the elastic bearings are laminated and have been referenced 10 and 11. In the embodiment of FIGS. 2 and 3, the elastic bar—referenced overall as 13—includes a tubular part 12 linked to an end swivel (referenced 14 in FIG. 2) and a tubular part of smaller section 15 linked to the other end swivel 16 and engaged coaxially in the tubular part 12. The two bearings 10 and 11 are clasped between these parts 12 and 15 whilst being axially spaced from one another, this procuring the advantages indicated above.

In the embodiment of FIG. 2, a fluid-filled leakproof chamber 17 is formed over the elastic bearing 10, being delimited in addition by the tubular parts 12, 15. Since this chamber communicates with the outside through a hole 18, the pressure therein can be varied. By adding fluid into the chamber 17, the pressure will increase therein, thereby subjecting the bar 13 to an axial force in the stretching direction, which force is transmitted to the structures between which it is caught up; by extracting fluid from this chamber 17 the pressure will diminish therein, thus creating an axial force in the opposite direction. The pressure in the chamber 17 can be controlled for example by virtue of a servovalve or a proportional distributor controlled by a pressure sensor.

Figure 1:
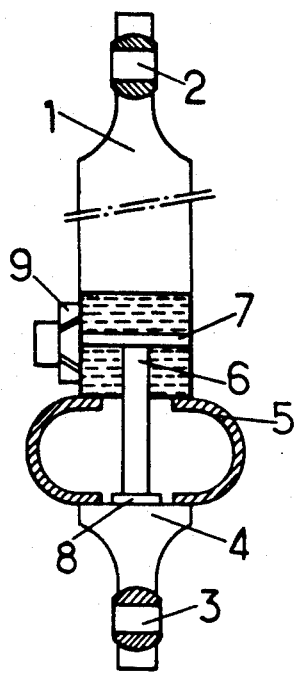

It is observed that such a chamber has the advantage regarding the hydraulic jack of FIG. 1 of a lower hydraulic stiffness, since it is partly bounded by the laminated bearing 10; there is also a total absence of friction, resulting in a greater ease of control.

According to another embodiment (FIG. 3), the bar 13 includes a fluid chamber 17 similar to the chamber 17 of the previous embodiment, but which can communicate with a compensating chamber 21 through a fluid column 20 axially traversing the part of smaller section 15. By virtue of a diaphragm 22, a pressurizing gas volume 23 is accommodated in this chamber 21. The pressure is thus relatively constant in this chamber.

Figure 4:
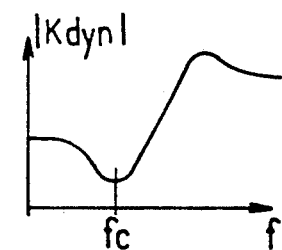
FIG. 4 is a graph showing the change in dynamic stiffness of the system of FIG. 3 and FIG. 5 the change in its damping, as a function of the frequency of the vibrations.
Figure 5:
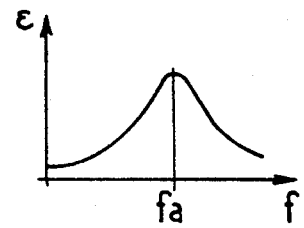

The dynamic stiffness |Kdyn| of the hydraulic resonator thus constituted in the bar 13 is represented in FIG. 4 as a function of frequency f, FIG. 5 representing the change in damping as a function of this frequency.

Such a system can be used in two different ways, depending on the various parameters of its dimensioning:

it is for example possible to arrange for the frequency $f_c$ (FIG. 4) for which the dynamic stiffness is a minimum to coincide with the frequency of troublesome vibrations; this enables their transmission to the structure to be protected to be more than halved by comparison with what would be obtained with a merely elastic bar;

the other solution could consist in making the frequency $f_a$ of vibrations for which the damping $\epsilon$ is a maximum coincide with the frequency of a harmful natural mode (FIG. 5).

In either case, the pressure in the main chamber 17 can still be varied, as in the embodiment of FIG. 2, by virtue of exterior means of supplying pressurized fluid, this to secure active control of the residual vibrations.

Figure 6:
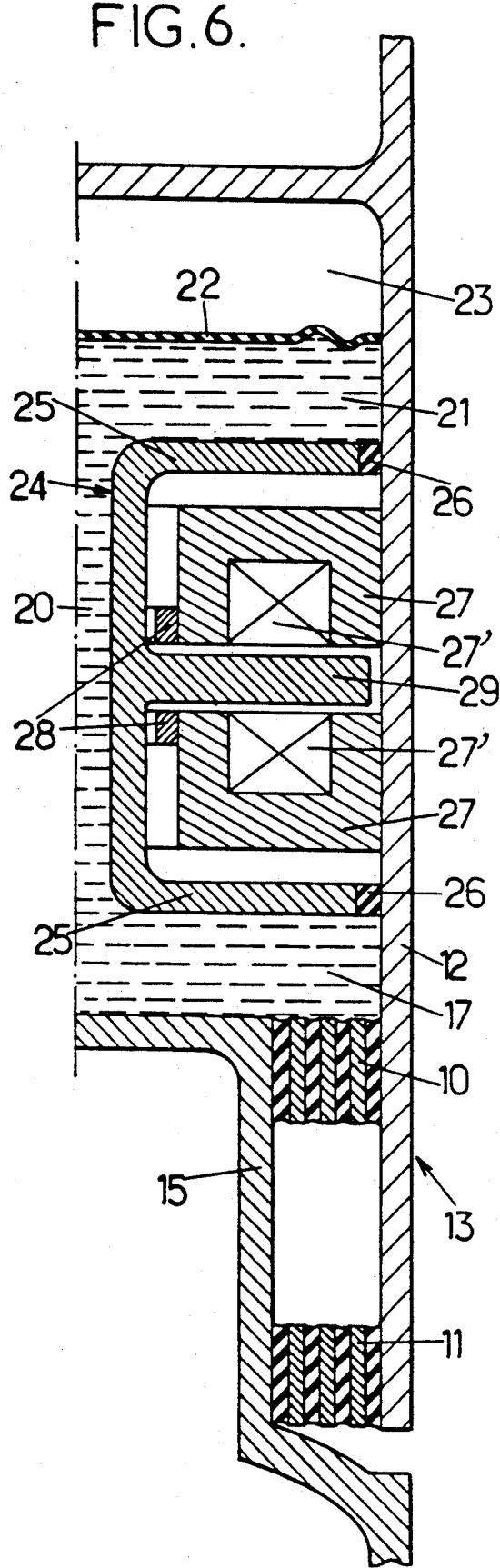
FIG. 6 is an axial half-sectional diagrammatic view of another embodiment of a connecting bar according to the invention.

In the embodiment of FIG. 6, the same references as in FIG. 3 have been used to designate the same parts of the bar 13, or parts which are similar or play the same role, even if they are arranged in a slightly different way. It is therefore unnecessary to proceed to a complete description of this figure. The main innovative element, by comparison with the embodiment of FIG. 3, lies in the arrangement of a hollow piston 24 in the tubular part 12 of the bar, the axial passage 20 of this piston constituting the fluid column apt to place the chamber 17 and the compensating chamber 21 in mutual communication. This piston 24 includes two flanges 25 connected to the tubular part 12 by deformable clasped bearings 26, possibly laminated, and enabling the piston 24 to be guided during its axial translational displacements in the tubular part 12. At the same time, these bearings 26 secure the return of the piston to its middle position, and the leakproofness of the chambers 17 and 21. The displacements of this piston can be controlled by any appropriate means, electrical, hydraulic, piezoelectric, magnetostrictive etc. In the example of FIG. 6, magnetic means have been represented: two annular electromagnets 27—27' mounted head-to-tail and associated with differential displacement sensors 28, are arranged between the flanges 25 of the piston, on either side of a ferromagnetic disk 29 integral with this piston (two ferromagnetic disks arranged on either side of the electromagnets, that is to say against the flanges 25, could also be used). These electromagnets 27 are stationary, being internally fastened to the tubular part 12. Consequently, by sending current into one or other of the coils 27' of the electromagnets, it will be possible to cause controlled axial displacements of the piston 24 in one or the other direction, in order to vary the fluid volume in the main chamber 17 and hence the pressure in this chamber. Thus, and as in the other embodiments, it will be possible to generate the requisite compensatory loads in the bar 13 and thus diminish the vibrations transmitted to the structure to be protected.

By virtue of the differential displacement sensors 28 the piston 24 can be positionally controlled and the disadvantage inherent in the lack of precision and of linearity of the system avoided.

Figure 7:
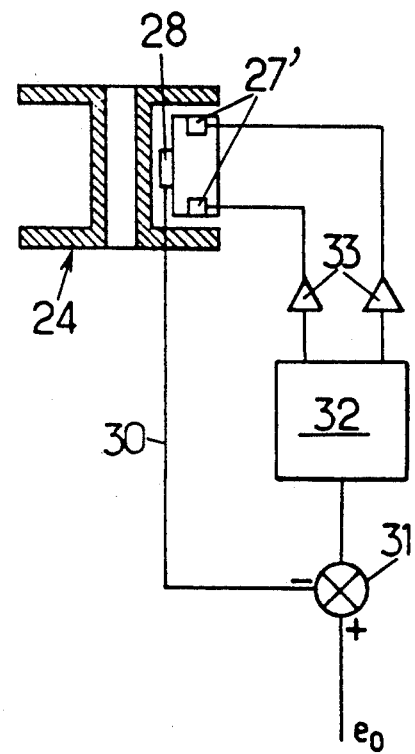
FIG. 7 is a diagram of a circuit for positional control of the piston of the embodiment of FIG. 6.

A control circuit has been represented by way of example in FIG. 7. The information provided by the sensors 28 is compared with a control input $e_o$ (loop 30, comparator 31). Depending on the result of the comparison, an electronic control block 32 determines the supply current for the coils 27' of the electromagnets, by way of amplifiers 33. Thereby, the piston 24 is positionally controlled and moves in accordance with the setpoint $e_o$, a command formulated by the electronics for active control of vibrations.

The problem of the attenuation of the vibrations transmitted by a vibrating structure such as a helicopter rotor to another structure (the pod of the helicopter) can still be resolved, on the basis of the concept of an active device with elastic connecting bars, of the type defined above, by virtue of a phase-shifter with controlled stiffness installed between the two parts 12 and 15 of the bar, still linked elastically to one another by elastic bearings—possibly laminated—10 and 11 similar to those of the previous embodiments.

The principle of such a phase-shifter has been shown diagrammatically in FIG. 8. With the vibrational excitatory source with angular frequency $\omega$ acting at M and the bar for elastic connection to the structure being represented by its stiffness K, the phase-shifter is provided by the parallel mounting of an auxiliary mass m in series with springs with controllable stiffness k.

Beyond its natural frequency, the system k, m, k is placed in phase opposition with the system M, K, resulting in an attenuation in the vibrations transmitted to the structure to be protected.

The amplitude amplification of the system is given by the following known formula:

$$\lambda = [(\omega^2/\omega^2_o - 1)^2 + 4\epsilon^2_o]^{-\frac{1}{2}}$$

in which $\omega_o$ is the resonant angular frequency and is the damping ($\epsilon_o = \frac{1}{2} \tan \delta$), $\delta$ being the phase-shift angle.

In order to be able to minimize the auxiliary mass m, it is of interest to obtain the maximum amplification and hence to minimize $\epsilon_o$ and $(\omega - \omega_o)$.

The following numerical examples show the respective influences of $\omega/\omega_o$ and of $\tan \delta$ on the value of the amplitude amplification $\lambda$.

| $\omega/\omega_o$ | $\tan \delta$ | $\lambda$ |
|---|---|---|
| 1.1 | 0.05 | 4.6 |
| — | 0.02 | 4.8 |
| 1.05 | 0.05 | 8.8 |
| — | 0.02 | 9.6 |
| 1.02 | 0.05 | 15.6 |

| $\omega/\omega_o$ | $\tan \delta$ | $\lambda$ |
|---|---|---|
| — | 0.01 | 24 |

In order to obtain a good amplitude amplification, it is seen that $\omega_o$ should continuously follow $\omega$ to within a few %, and that the damping should be as weak as possible.

The embodiments of the invention which will be described below have the objective of following the excitatory frequency continuously, even when it is variable, by altering the stiffness of the phase-shifter, and of using additional elastomeric-metal or composite elastomeric springs to minimize the damping, doing so for maximum travels of a few tens of mm.

These results are obtained with the embodiments of FIGS. 9 and 10.

In the embodiment of FIG. 9, the additional beating mass m of the phase-shifter consists of the mass of a tube 34 surrounding the elastic bar 13 at the level of the elastic bearings 10 and 11. The function of the springs k of the basic diagram of FIG. 8 is secured by radial composite spring leaves 35 rigidly mounted on the one hand between rigid-mounting clamps 36 of the tube 34 and on the other hand rigid-mounting clamps 37 and 38 mounted respectively on the tubular parts 15 and 12 of the bar 13. The stiffness of the springs thus constituted can for example be adjusted by placing the rigid mounts 37 and 38 in controlled compression, for example by means of controlled jacks symbolized by the arrows F, acting on a mobile part of the rigid mount.

In the variant embodiment of FIG. 10, use is made of a spring leaf 35 traversing the bar 13 (extending between two diametrically opposed rigid mounts 36), this permitting the radial bulkiness of the system to be reduced, a jack F then sufficing to secure the regulating of the stiffness of the leaf, by compressing or relaxing a central mobile rigid mount 37 integral with the part 15 of the bar. A similar setup could be adopted on the other side, for the leaf 35 linking the other rigid mount 36 to the part 12 of the bar.

It should be noted furthermore that the mass 34 can be guided over the bar 13 by low-friction pads, of teflon or similar material.

It will in any case be understood that the jacks for placing the rigid mounts in compression, in order to regulate the stiffness of the leaves 35, will be controlled, by virtue of an appropriate control circuit, on the basis of a comparison between the excitatory frequencies and the beat frequencies of the system. It will be possible to undertake the acquisition of these frequencies by way of accelerometers.

It can also be envisaged to regulate the stiffness k of the leaves 35 by making stops 39 with variable radial position act upon them, as represented in FIGS. 11 and 12, these stops being laid out over a spiral cam, the angle of rotation of which it will also be possible to control in one direction or the other by virtue of an appropriate control circuit. Of course, in this case it will be possible to use constant pressure rigid mounts 36 and 37.

Other stops (not shown) enable the displacements of the mass 34 to be limited in both directions.

We claim:

1. An elastic connecting bar for use in an active control system which system is used to control a transmission of vibrations along the bar, the bar comprising:
 a first end which is subjected to vibrational loads exerted along an axis of the bar;
 a second end linked to a structure which is to be isolated from vibrations created by the vibrational also using the active control system;
 a tubular part linked to one of said ends;
 a central part linked to the other of said ends which is surrounded by said tubular part;
 at least two axially spaced bearings which transversely link said tubular part and said central part;
 a leakproof chamber filled with hydraulic fluid which is bounded by said tubular part, said central part, and one of said elastic bearings;
 a compensating chamber having a diaphragm which divides said compensating chamber into a first volume filled with hydraulic fluid and a second volume filled with a pressurizing gas;
 a piston which is axially mounted in said tubular part and which separates said leakproof chamber and said first volume of said compensating chamber, said piston including an axial passage which fluidity connects said leakproof chamber and said first volume of said compensating chamber; and
 a motor means or controllingly displacing said piston in said tubular part so that displacements of said piston cause fluid transfers between said chambers and thus load compensating pressures in said leakproof chamber.

2. A connecting bar as claimed in claim 1 and further including a phase-shifter connected between said tubular part and said central part, said phase-shifter having a stiffness so that a resonant frequency of said phase-shifter coincides with a frequency of the vibrational loads in order to effect maximum attenuation of the vibrations thereof.

3. A connecting bar as claimed in claim 2 wherein said phase-shifter includes a regulating means for regulating the stiffness thereof according to a beat frequency of the connecting bar.

4. A connecting bar as claimed in claim 3 wherein said phase-shifter further includes an exterior tubular means surrounding the connecting bar and respective first and second radial spring leaves with weak dampening which are all rigidly mounted to said exterior tubular mass and which are respectively mounted to said tubular part and said central pat with said first and second spring leaves being regulated by said regulating means.

5. A connecting bar as claimed in claim 4 wherein said phase-shifter includes first and second rigid end mounts for radial ends of respective said first and second radial spring leaves adjacent said tubular mass and first and second other rigid mounts for another portion of respective said fist and second radial spring leaves, and wherein said regulating means includes a means for biasing said first and second other rigid mounts relative to one another.

6. A connecting bar as claimed in claim 4 wherein aid first and second radial spring leaves are each laid out in a rotary spiral configuration, and wherein said regulating means includes stops which are adjustably mounted on said spring leaves.

7. A connecting bar as claimed in claim 1 wherein said motor means includes a ferromagnetic disk integral with said piston and an annular electromagnet located on each side of said disk.

8. A connecting bar as claimed in claim 7 wherein said motor means includes a control circuit for controlling the displacements of said piston, said control circuit including a displacement sensor for effecting positional control of said piston and thus ensuring active control of the vibrations of the bar.

9. A connecting bar as claimed in claim 1 wherein said motor means includes a control circuit for controlling the displacements of said piston, said control circuit including a displacement sensor for effecting positional control of said piston and thus ensuring active control of the vibrations of the bar.

10. An elastic connecting bar for use in an active control system which system is used to control a transmission of vibrations along the bar, the bar comprising:
   a first end which is subjected to vibrational loads exerted along an axis of the bar;
   a second end linked to a structure which is to be isolated from vibrations created by the vibrational loads using the active control system;
   a tubular part linked to one of said ends;
   a central part linked to the other of said ends which is surrounded by said tubular part;
   at least two axially spaced bearings which transversely link said tubular part and said central part; and
   a phase-shifter connected between said tubular part and said central part, said phase-shifter having a stiffness so that a resonant frequency of said phase-shifter coincides with a frequency of the vibrational loads in order to effect maximum attenuation of the vibrations thereof.

11. A connecting bar as claimed in claim 10 wherein said phase-shifter includes a regulating means for regulating the stiffness thereof according to a beat frequency of the connecting bar.

12. A connecting bar as claimed in claim 11 wherein said phase-shifter further includes an exterior tubular mass surrounding the connecting bar and respective first and second radial spring leaves with weak dampening which re all rigidly mounted to said exterior tubular mass and which are respectively mounted to said tubular part and said central pat with said first and second spring leaves being regulated by said regulating means.

13. A connecting bar as claimed in claim 12 wherein said phase-shifter includes first and second rigid end mounts for radial ends of respective said first and second radial spring leaves adjacent said tubular mass and first and second other rigid mounts for another portion of respective said first and second radial spring leaves, and wherein said regulating means includes a means for biasing said first and second other rigid mounts relative to one another.

14. A connecting bar as claimed in claim 12 wherein said first and second radial spring leaves are each laid out in a rotary spiral configuration, and wherein said regulating means includes steps which re adjustably mounted on said spring leaves.

15. A connecting bar as claimed in claim 10 wherein said phase-shifter further includes an exterior tubular mass surrounding the connecting bar and respective first and second radial spring leaves with weak dampening which re all rigidly mounted to said exterior tubular mass and which are respectively mounted to said tubular part and said central part.

* * * * *